US012128429B2

(12) United States Patent
Mock et al.

(10) Patent No.: US 12,128,429 B2
(45) Date of Patent: Oct. 29, 2024

(54) ATOMISER AND SHOWERHEAD

(71) Applicant: Gjosa SA, Biel (CH)

(72) Inventors: Elmar Mock, Salvan (CH); Patrick Raeber, Neuchâtel (CH); Max Rousselet, Prêles (CH)

(73) Assignee: GJOSA SA, Biel (CH)

( * ) Notice: Subject to any disclaimer, the term of this patent is extended or adjusted under 35 U.S.C. 154(b) by 643 days.

(21) Appl. No.: 17/281,402

(22) PCT Filed: Oct. 1, 2019

(86) PCT No.: PCT/EP2019/076643
§ 371 (c)(1),
(2) Date: Apr. 29, 2021

(87) PCT Pub. No.: WO2020/070159
PCT Pub. Date: Apr. 9, 2020

(65) Prior Publication Data

US 2022/0040713 A1 Feb. 10, 2022

(30) Foreign Application Priority Data

Oct. 2, 2018 (CH) .................................... 01204/18

(51) Int. Cl.
*B05B 1/26* (2006.01)
*B05B 1/18* (2006.01)
*B05B 15/65* (2018.01)
*B05B 15/18* (2018.01)

(52) U.S. Cl.
CPC ................ *B05B 1/26* (2013.01); *B05B 1/185* (2013.01); *B05B 15/65* (2018.02); *B05B 15/18* (2018.02)

(58) Field of Classification Search
CPC ........... B05B 1/26; B05B 15/65; B05B 1/185; B05B 15/18
USPC ................. 239/380–383, 251, 543, 544, 433
See application file for complete search history.

(56) References Cited

U.S. PATENT DOCUMENTS 1,246,092 A * 11/1917 Hardie ...................... B05B 1/12 239/451
2,639,192 A * 5/1953 Fletcher ................. B05B 11/06 239/543
2,744,738 A 5/1956 Hjulian
3,672,574 A 6/1972 Knapp
(Continued)

FOREIGN PATENT DOCUMENTS

BE 514104 9/1952
CN 107866338 4/2018
(Continued)

OTHER PUBLICATIONS

Switzerland Search Report dated Mar. 12, 2019, U.S. Appl. No. 12/042,018, 4 pages.

*Primary Examiner* — Steven J Ganey
(74) *Attorney, Agent, or Firm* — Rankin, Hill & Clark LLP

(57) ABSTRACT

An atomiser is for use in a showerhead or tap for dispensing a liquid, in particular water or a water-based mixture, includes a set of at least two nozzles arranged to create colliding jets of the liquid and thereby create a spray of droplets of the liquid, and a spray shaper for guiding the spray. The atomiser has a nozzle element with the nozzles, and a spray shaper, the nozzle element and spray shaper being separate parts.

30 Claims, 4 Drawing Sheets

(56) References Cited

U.S. PATENT DOCUMENTS

| | | | | |
|---|---|---|---|---|
| 6,513,730 | B1 * | 2/2003 | Okojie | F02M 61/18 239/381 |
| 8,458,826 | B2 | 6/2013 | Mock et al. | |
| 8,905,332 | B2 * | 12/2014 | Luettgen | B05B 3/04 239/383 |
| 11,517,921 | B2 * | 12/2022 | Mock | B05B 1/26 |
| 2005/0001072 | A1 * | 1/2005 | Bolus | B05B 1/26 239/548 |
| 2014/0110504 | A1 | 4/2014 | Honeyands et al. | |
| 2021/0148321 | A1 * | 5/2021 | Mulye | B05B 1/26 |

FOREIGN PATENT DOCUMENTS

| | | | |
|---|---|---|---|
| JP | 2013-116467 | A | 6/2013 |
| RU | 2 612 631 | C1 | 3/2017 |
| WO | 2004/101163 | | 11/2004 |
| WO | 2011/054120 | | 5/2011 |

* cited by examiner

ATOMISER AND SHOWERHEAD

BACKGROUND OF THE INVENTION

Field of the Invention

The invention relates to an atomiser for use in an outlet for spraying a liquid such as water or a water-based mixture, for example in a washing installation as used in the field of domestic plumbing installations, and to a showerhead.

Description of Related Art

WO 2004/101163 A1 discloses a showerhead with a large number of nozzle pairs, each nozzle pair creating impinging jets of water with the goal of creating a spray of water. The showerhead is supposed to operate well over a range of pressures.

BE 514104A discloses a spray head with colliding water jets created by four inclined holes in in a flat plate, at an angle of 45°. The thickness of the plate is 1 to 5 mm. The diameter of the holes is said to be smaller than 12 mm.

U.S. Pat. No. 2,744,738 discloses an aerator with colliding water jets, including flow guiding elements after the point of collision.

U.S. Pat. No. 3,672,574 shows a device for aerating a jet of water, with passages creating jets of water that flow towards one another, take up air and then flow around a ball that serves to stabilise the flow.

U.S. Pat. No. 8,458,826 discloses an outlet for a shower or tap wherein water is dispensed at a low flow rate and at a high pressure, typically more than 10 bar, through impinging jets. As opposed to WO 2004/101163 A1 cited above, only one or two nozzle pairs are sufficient for an outlet in a showerhead. A good washing experience, that is, a feeling of a full water flow and good rinsing in spite of the low flow rate, is obtained by atomisation of the water by means of the colliding jets, which in turn is a result of the high pressure.

WO 2011/054120 A1 discloses, for example in embodiments according to FIGS. 4 to 6 and FIGS. 20 to 23, cartridges for generating a spray of a liquid, such as water or water-based mixture, from colliding jets. Such cartridges can be integrated units for atomising and spraying such a liquid a water-based mixture, by means of impinging jets of the liquid under high pressure.

Existing devices using impinging jets of water for generating a spray of water, in particular for application to the human body, either exhibit a water flow that is too large to be considered water saving, or require a pump for increasing the water pressure. Furthermore, for operation at relatively high pressures and with small diameters of the liquid jets, they require a very precise alignment of the nozzles.

There is a need to simplify and/or standardise the manufacture of a nozzle arrangement and/or a showerhead for generating a spray of water, in particular for applications to the human body.

The following terms shall be used: An outlet includes one or more atomisers. An atomiser has, for example, a nozzle set with two or more nozzles for creating impinging jets of water. As opposed to sprayers ordinarily used in showers, an atomiser generates a flow of a mixture of air and microscopic water droplets rather than macroscopic drops. An outlet can be a part of a tap, or can be a shower head attached to a handle, or a shower head fixedly installed at the end of a pipe or sunk in a wall. An outlet thus is a unit that can be transported, handled and installed as a single unit, in contrast to a shower installation: A shower installation may include more than one shower heads, arranged, for example, at the top of and in side walls of a shower cabin, with additional plumbing providing the shower heads with water. The water can be at mains pressure or at a pressure elevated above the mains pressure, e.g. by means of a pump.

SUMMARY OF THE INVENTION

It is an object of the invention to improve over existing devices, in particular over an atomizer and showerhead of the type mentioned initially, for use in a washing device in a domestic plumbing installation or in a portable shower or hand washing unit, overcoming the disadvantages mentioned above.

According to a first aspect, which can be realised in combination with or independently from the other aspects, an atomiser as follows is provided:

The atomiser is for use in a showerhead or tap for dispensing a liquid, in particular water or a water-based mixture. It includes a set of at least two, in particular exactly two, nozzles arranged to create colliding jets of the liquid and thereby create a spray of droplets of the liquid, and a spray shaper for guiding the spray.

In embodiments, the atomiser includes a nozzle element with the nozzles, and a spray shaper, the nozzle element and spray shaper being separate parts. Alternatively, the nozzle element and spray shaper are integrally shaped. That is, they are shaped as a single part.

In embodiments, each nozzle includes a nozzle inlet, arranged in a corresponding outer surface or first surface of the nozzle element, wherein the first surface in the region of the nozzle inlet is essentially planar and at a right angle to the longitudinal axis of the respective nozzle. This region can be a section of the first surface of the nozzle element which is chamfered.

In embodiments, each nozzle includes a nozzle outlet, arranged in a corresponding inner surface or second surface of the nozzle element, wherein the second surface in the region of the nozzle outlet is essentially planar and at a right angle to the longitudinal axis of the respective nozzle. This region can be a section of the second surface of the nozzle element which constitutes a recess in the nozzle element.

In embodiments, the surfaces at which the nozzles enter and exit the nozzle element are inclined relative to a plane normal to the longitudinal axis of the nozzle element.

In embodiments, the nozzle element includes a first surface, the first surface including chamfered sections, with nozzle inlets of the nozzles lying in the chamfered sections.

The first surface, when the atomiser is in operation, is oriented towards a conduit that guides the liquid to the nozzles.

In embodiments, surfaces of the chamfered sections lie at a right angle to the longitudinal axis of the respective nozzle, and in particular the surfaces of the chamfered sections are essentially planar.

This makes it possible to precisely machine the nozzles, e.g. by drilling of laser cutting.

In embodiments, the nozzle element includes a second surface, the second surface including a recess, with nozzle outlets of the nozzles leading into the recess.

The second surface, when the atomiser is in operation, is oriented towards the spray shaper, towards the outlet opening.

In embodiments, a surface of the recess, in regions including the nozzle outlets, lies at a right angle to the longitudinal axis of the respective nozzle, and in particular the surfaces of these regions are essentially planar.

In embodiments, the longitudinal axes of the nozzles lie at an angle of 45°+/−15° degrees to a longitudinal axis of the nozzle element, in particular at an angle of 45°+/−5° degrees. Thus, the angle can be up to 60° degrees.

The longitudinal axis of the nozzle element typically is an axis of rotational symmetry of the nozzle element.

In embodiments, the spray shaper includes an inner wall defining an inner volume of the spray shaper, the inner volume opening up from a region near the nozzles towards a front surface of the spray shaper, in particular the inner wall near the nozzles having a first, smaller diameter and near the front surface having a second, larger diameter.

In a transitional region between the first and second diameter, the diameter can increase monotonously, e.g. linearly (the inner surface thus forming a truncated cone) or nonlinearly.

In embodiments, the first diameter is between six and ten millimetres, in particular eight millimetres.

In embodiments, the second diameter is between ten and twenty-two, in particular thirteen and nineteen, in particular sixteen millimetres.

In embodiments, a distance between a back surface and the front surface is between six and ten, in particular eight millimetres.

In embodiments, a minimum thickness of a wall of the spray shaper, between the second diameter and an outer, circumferential surface of the spray shaper, is at least three or four or five millimetres. At other locations along the spray shaper, where the inner wall is closer together, the wall thickness is correspondingly larger. The mass of wall material helps attenuate noise generated by the impinging jets.

The front surface of the spray shaper is oriented in a direction in which the spray exits the outlet opening. The back surface is oriented in the opposite direction. The front and back surfaces are normal to a longitudinal axis of the spray shaper. The longitudinal axis typically is an axis of rotational symmetry of the spray shaper.

In embodiments, the nozzle element and spray shaper being assembled in a body, with the spray shaper connected to the body by means of a locking section and the spray shaper pressing and holding the nozzle element against the body.

In embodiments, when the nozzle element and spray shaper are assembled, the recess in the nozzle element forms a spray shaping back end that is in communication with an inner volume of the spray shaper, defined by the inner wall. This inner volume and the spray shaping back end cooperate to form the spray generated by the colliding jets of water.

In embodiments, the recess forming the spray shaper back end has the shape of a truncated cone. In particular, it can be a truncated circular or oval cone, optionally a cone based on an oval with straight sides. The oval's straight sides correspond to planar sections of the cone surface. The nozzles exit in these planar sections.

In embodiments, a depth of the recess forming the spray shaping back end in the spray shaper is between two and three or four millimetres, and an outer diameter of the recess, measured in a plane in which the nozzles lie, is between four and eight millimetres, in particular six millimetres. A smallest diameter of the recess, measured at its narrowest point, can be between three and four millimetres, in particular two millimetres.

In embodiments, the spray shaper is connected to the body by means of a non-separable connection, in particular by gluing or welding.

In embodiments, a gasket is arranged between the spray shaper and the nozzle element.

In embodiments, the nozzle element and spray shaper are manufactured of a different material, in particular the nozzle element being made of a non-plastic material, in particular metal or ceramic, and the spray shaper being made of a plastic material.

This allows to manufacture the nozzle element and the geometry of the nozzles with high precision in a hard and resistant material, and the other parts in a light material that is easier to weld. In embodiments, the body is also made of a plastic material and the spray shaper is welded to the body, in particular by ultrasound welding. Furthermore, the nozzle element can be standardised, and be combined with different versions and geometries of the spray shapers, depending on the application.

In embodiments, the nozzle element and/or spray shaper includes an anti-microbial treatment. In embodiments, the nozzle element and spray shaper are inseparably connected. In embodiments, the nozzle element and spray shaper can be disassembled.

In embodiments, the atomiser includes a nozzle element and a set including two or more interchangeable and different spray shapers.

This allows to adapt the atomiser to different uses.

According to a second aspect, which can be realised in combination with or independently from the other aspects, an atomiser as follows is provided:

The atomiser, for use in a showerhead or tap for dispensing a liquid, in particular water or a water-based mixture, includes a set of at least two, in particular exactly two, nozzles arranged to create colliding jets of the liquid and thereby create a spray of droplets of the liquid, and a spray shaper for guiding the spray, and the atomiser preferably further includes three or four or more nozzles.

In other embodiments, the nozzles are arranged in a nozzle element that is separate from the spray shaper. In other embodiments, the nozzles are arranged in a combined part (or sprayer) constituting at least the nozzle element and spray shaper.

Terminology:

- Stating that a nozzle lies in a plane is the same as stating that the longitudinal axis of the nozzle lies in the plane.
- A statement about that an angle between two nozzles is the same as the statement about the angle between their longitudinal axes.
- Each pair of nozzles can define an associated nozzle plane in which the two nozzles lie, and an associated bisecting plane that is perpendicular to the nozzle plane and bisects the angle between the nozzles In embodiments, the three or four nozzles lie in a plane, the plane including the longitudinal axis of the atomiser. This longitudinal axis typically coincides with the longitudinal axis of the spray shaper and the longitudinal axis of the nozzle element.

In embodiments, the jets of the three or four nozzles intersect in one point.

In embodiments, the atomiser includes four nozzles, wherein the jets of the four nozzles pairwise intersect at different points along the longitudinal axis of the atomiser.

In embodiments, the atomiser includes two pairs of nozzles, wherein

- each pair of nozzles defines an associated nozzle plane in which the nozzles lie, and an associated bisecting plane that is perpendicular to the nozzle plane and bisects the angle between the nozzles, and wherein
- the bisecting planes of the two pairs of nozzles are parallel to one another and displaced relative to one another in a direction normal to the bisecting planes.

Thus, when in operation, the first pair nozzles initially—that is, before the sheet breaks up into droplets—creates a first sheet of water and the second pair of nozzles initially creates a second sheet of water, and the two sheets are parallel to one another and displaced relative to one another in a direction normal to the sheets. In this way, a fuller spray is generated without increasing size of the atomiser.

In embodiments, the inner wall of the spray shaper has a cross section in the shape of an oval, or of a or rounded rectangle.

In embodiments, the longitudinal axis of a central nozzle of the three or four or more nozzles is coincident with the longitudinal axis of the nozzle element.

The central nozzle disrupts the spray created by the other nozzles. If the central nozzle is not present, then the impacting jets, in cooperation with the spray shaper, creates a spray formed like a hollow cone. Ambient air is sucked into the inside of the cone, against the direction of the spray, and then is carried outward again as part of the spray. The interaction of the air and the water can cause noise. The central nozzle causes the spray to be a full cone. Air is no longer sucked into the inside of the cone. As a result, the noise created by the interaction of air is markedly reduced. This makes the use of the nozzle in a shower or in another sanitary setting more agreeable.

In embodiments, the longitudinal axes of the nozzles other than the central nozzle lie at an angle of 45°+/−15° degrees to the longitudinal axis of the nozzle element, in particular at an angle of 45°+/−5° degrees.

In embodiments, the diameter of the central nozzle is between 60% and 90%, in particular between 70% and 85%, in particular between 75% and 80% of the diameter of the nozzles other than the central nozzle.

It has been found that such a smaller diameter of the central nozzle, with respect to the other nozzles, creates a better quality shape of the spray, in particular a more regular and essentially conical spray. This is in comparison to a larger central nozzle, which disrupts the spray too much.

In embodiments, the number of nozzles other than the central nozzle is two. In embodiments, the number of nozzles other than the central nozzle is three. In embodiments, the number of nozzles other than the central nozzle is four.

In embodiments, an inner diameter of the nozzles other than the central nozzle is between 0.8 and 1.5 millimetres, and a throat of each of the nozzles, along which the nozzle has a constant diameter, has a length that is at least three times this inner diameter, and in particular at least 2.4 or at least three millimetres.

According to a third aspect, which can be realised in combination with or independently from the other aspects, a showerhead as follows is provided:

The showerhead in particular includes one or more atomisers, each atomiser including a set of at least two, in particular exactly two, nozzles arranged to create colliding jets of the liquid and thereby create a spray of droplets of the liquid, and a spray shaper for guiding the spray.

The showerhead further includes a conduit and atomiser unit and a shell unit, wherein the conduit and atomiser unit includes a conduit element and one or more atomisers, the conduit element being arranged to guide water from a water hose attachment to the one or more atomisers and the one or more atomisers being rigidly attached to and supported by the conduit element;

the shell unit including at least a first shell part arranged to cover at least part of the conduit and atomiser unit and to provide a handhold for holding the conduit and atomiser unit.

In embodiments, the conduit and atomiser unit constitutes a structurally independent, self-supporting and watertight unit that, in particular, can perform the function of guiding water from the water hose attachment to the one or more atomisers without any part of a shell unit being present.

In embodiments, the showerhead includes a second shell part, wherein the first and second shell part together form the shell unit, and the shell unit encloses and holds the conduit and atomiser unit.

In other words, the shell unit has no water flow related function. It can be freely dimensioned and configured with regard to material—and consequently also colour and finishing—ergonomics, shape etc. Since both the conduit and the one or more atomisers can made relatively small in comparison with traditional shower or spraying heads, while still providing for an agreeable spray shape, showering experience and good rinsing, they impose fewer geometric constraints on the complete showerhead. This in turn leaves greater freedom for the shape and arrangement of the shell unit.

In embodiments, the conduit element is manufactured as a single piece.

This can be done, for example, by moulding with a plastic material.

In embodiments, the showerhead includes two or three atomisers. In embodiments, the showerhead includes four, five or six atomisers.

Showerheads for different applications can be manufactured with different numbers of atomisers. Since each atomiser includes its own spray shaper, and atomisers can be standard precision units, manufacturing the complete showerhead becomes simple and less demanding.

In embodiments, the one or more atomiser units are removably attached to the conduit element, in particular by screwing.

In embodiments, the one or more atomiser units are removably attached to the conduit element by a snap-fit connection. In particular, the atomiser units can be inserted into the conduit element from the front side. The front side of the conduit element is the side at which the spray exits the showerhead.

In embodiments, the one or more atomiser units is irremovably attached to the conduit element, in particular by gluing or welding, in particular by ultrasound welding.

The following properties of the atomiser can hold for each of the different aspects:

The atomiser for use in a showerhead or tap is designed for dispensing a liquid, in particular water or a water-based mixture. It includes a set of at least two, in particular exactly two, nozzles arranged to create colliding jets of the liquid and thereby create a spray of droplets of the liquid, and a spray shaper for guiding the spray.

Therein, an inner diameter of the nozzles is between 0.8 and 1.5 millimetres, and a throat of each of the nozzles, along which the nozzle has a constant diameter, has a second length that is at least three times this inner diameter.

In embodiments, the inner diameter is between 0.8 and 2 millimetres.

In embodiments, a radius (Re) of an edge forming a transition between the inner surface of the nozzles and the inner surface of the spray shaper is less than two or less than one or less than 0.8 or less than 0.5 millimetres.

Such a small radius prevents the jet of water exiting the nozzle from following, due to adhesion to the nozzle walls, the surface of the nozzle and being spread out.

In embodiments, a distance between a collision point, at which the jets collide, and front surface is five to nine times, in particular six to eight times, in particular seven times a distance between nozzle outlets and a point at which the jets collide.

In absolute terms, this distance between nozzle outlets and a point at which the jets collide can be between 1 and 7 millimetres.

A distance between centres of the nozzle outlets can be between 2 and 7, in particular between 4 and 5 millimetres.

In embodiments, the nozzles are arranged for the jets of liquid to collide at an angle between 70° and 110°, in particular between 80° and 100°, in particular 90°.

In embodiments, a distance between a point at which the jets collide and a back wall of a spray shaper back end lies between 2 and 7, in particular between 3 and 5, in particular between 3 and 4 millimetres.

The back wall of the spray shaper back end lies at the back of the spray shaper, at maximum distance from the spray shaper front end.

In embodiments, an angle at which the nozzles exit at an inner surface of the spray shaper (at a spray shaper back end) is more than 70°, in particular more than 80° and in particular equal to 90°.

This reduces—compared to smaller angles—disturbance of the flow by an asymmetric nozzle outlet.

In embodiments, each nozzle inlet is arranged in a corresponding section of the first or outer surface of the nozzle element, wherein this section is essentially planar and at a right angle to the longitudinal axis of the respective nozzle.

In embodiments, a region near each nozzle inlet is free from diversion or flow redirecting elements that are arranged to homogenise and even out the flow, thereby causing it to lose energy.

In embodiments, at least the spray shaper and the nozzles include surfaces with a roughness Ra that is smaller than 0.8 micrometres, corresponding to ISO Roughness Grade N6.

This improves the flow of the liquid through the nozzles and its reflection within the spray shaper, reducing loss of energy in the flow.

The roughness parameter Ra is the arithmetic average value of a roughness profile determined from deviations about its centre line.

In embodiments, the nozzles each have an asymmetrical cross section, with a narrower part of the cross section being closer to a bisecting line of the longitudinal axes of the nozzles, and a broader part of the cross section being further away from the bisecting line.

The bisecting line of the longitudinal axes of the nozzles typically is coincident with a central longitudinal axis of the nozzle element and the spray shaper.

Such a shape of the nozzle can focus the kinetic energy in the water jets in the direction of the outlet. This in turn can increase the transfer of energy into the spray, improving the quality of the spray (small droplets).

For a nozzle having an asymmetrical cross section instead of a circular cross section, the diameters specified herein represent the hydraulic diameter of the nozzle.

In embodiments, the nozzle cross section is a triangle or a triangle with rounded corners.

In embodiments, the following combination of parameters is realised:

Nozzle diameter: 0.8 to 1.5 millimetres.

Length of section of nozzles with constant diameter: at least 2.4 or 4 or 6 or 8 millimetres.

Surface roughness inside the nozzles and/or at the inside of the spray shaper: smaller than 0.8 micrometres, corresponding to ISO Roughness Grade N6.

Angle between inner surface of spray shaper and the adjacent surface of the edge protection section: between 35° and 72°, in particular between 55° and 65°.

In embodiments, in addition the following parameter is realised:

Radius of edge at discontinuity or nozzle outlet: less than 1 millimetre, in particular less than 0.8 millimetres, in particular less than 0.5 millimetres.

In embodiments, in addition the following parameter is realised:

Radius of the flow guiding edge at the angle between the inner surface of the spray shaper and the adjacent front surface of the spray shaper: less than 1 millimetre, in particular less than 0.8 millimetres, in particular less than 0.5 millimetres.

In embodiments, in addition the following parameter is realised:

Distance between collision point and front surface (approximately equal to the length of the spray shaper): Between 14 and 30 millimetres, in particular between 17 and 25 millimetres, in particular between 20 and 22 millimetres.

The method for operating the cartridge in a showerhead or tap for dispensing a liquid, in particular water or a water-based mixture, includes the steps of providing the liquid to the cartridge with a pressure in the range of 1 bar to 5 bar, in particular from 1 bar to 3 bar, and more particular, from 1.5 bar to 3 bar;

guiding the liquid through a pair of nozzles with a flow rate between 2 litres per minute and 3 litres per minute, in particular with 2.5 litres per minute, In embodiments, two or three cartridges are combined with a single outlet. The total flow rate of such an outlet is the sum of flow rates of the cartridges. For example, with three cartridges, the total flow rate can be up to 6 or 7 or 8 litres per minute.

In embodiments, a velocity of the liquid in each of the nozzles is larger than 10 metres per second or 20 metres per second or 30 metres per second.

In embodiments, a velocity of the liquid in the nozzles is larger than 10 metres per second or 20 metres per second or 30 metres per second. Typically, the velocity is lower than 70 metres per second or 60 metres per second or 50 metres per second.

In a method for operating an atomiser at mains pressure, the velocity can be between 10 and 30 metres per second, in particular around 20 metres per second. In a method for operating an atomiser at an increased pressure, relative to a mains pressure, using a pump, the velocity can be between 30 and 50 metres per second, in particular around 40 metres per second. A mains pressure can be 3 bar. An elevated pressure generated by the pump can be 10 bar.

The atomiser can be arranged in an outlet. The outlet can be a showerhead or a tap.

The atomiser, nozzle elements, spray shapers, nozzle arrangements outlets, and other elements described herein are preferably applied to a washing device with one or more atomisers designed for operating at a reduced flow, that is, a flow of less than 61/min or 41/min or 21/min per atomiser (in particular, per nozzle set) for an outlet in a shower; and a flow of less than 21/min or 11/min or 0.51/min per atomiser (in particular, per nozzle set) for an outlet in a tap.

In embodiments, the atomiser and/or shower are designed to operate, in combination with such a reduced flow rate, at a typical mains water pressure, that is, a pressure in the range of 1 bar to 5 bar, in particular from 1 bar to 3 bar, and more particular, from 1.5 bar to 3 bar.

In other embodiments, the atomiser and/or shower are designed to operate, in combination with such a reduced flow rate, at a pressure elevated above that of a typical mains water pressure, that is, at a pressure higher than 5 bar, higher than 8 bar or higher than 10 bar.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical parts are provided with the same reference symbols in the figures.

Figure 1:
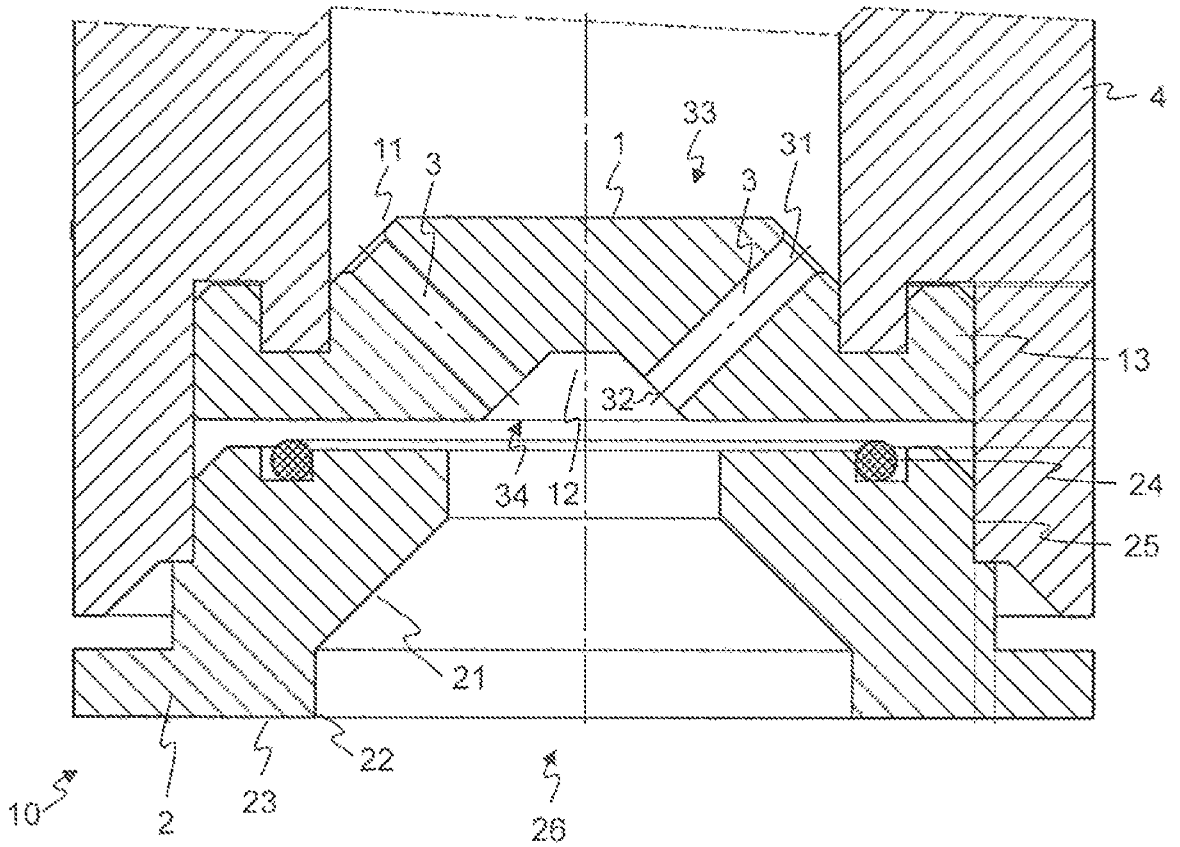
FIG. 1 a cross section through an atomiser.

FIG. 1 schematically shows an atomiser, including a body 4 holding a nozzle element 1 and a spray shaper 2. The nozzle element 1 includes two or more nozzles 3 for creating impinging jets of liquid. The impinging jets initially create a sheet of water which then breaks up into a spray of droplets. The spray shaper 2, by means of the shape of an inner wall 21, guides the flow of droplets and air that is carried along with the droplets, and controls the shape of the spray leaving the spray shaper 2 through an outlet opening 26.

Figure 2:
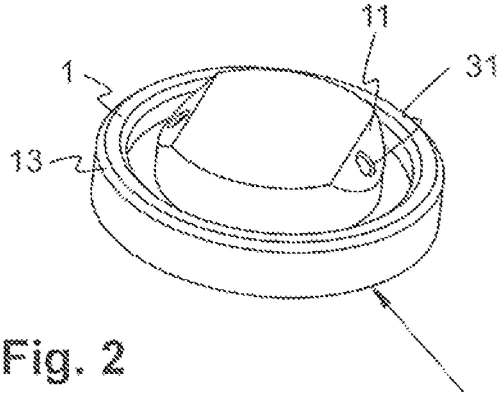
FIG. 2-3 a nozzle element.
Figure 3:
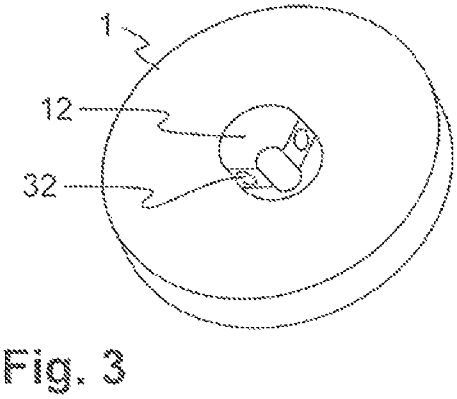

The nozzle element 1, also shown in FIGS. 2 and 3, can be manufactured from metal or a ceramic material, or from a plastic material different from, in particular harder than, the material of the spray shaper 2. The metal can be brass, copper or a copper-based alloy.

In this embodiment, the nozzles 3 are shaped in the nozzle element 1 itself. The part of the nozzle element 1 that is exposed to inflowing liquid can be shaped as a truncated cone (as shown in the figures), or as a (complete) cone.

In other embodiments, the nozzles 3 are shaped in nozzle inserts. Nozzle inserts can be made of ceramic or polymer or metal and are can be inserted in the nozzle element 1 and secured in an inseparable manner, e.g. a press fit, by gluing or welding or by being arranged in the cartridge by insertion moulding.

Each nozzle 3 extends from a nozzle inlet 31 at the outside of the nozzle element 1 to a nozzle outlet 32. A point at which the longitudinal axes of the nozzles 3 intersect is the point of collision of liquid jets created by the nozzles 3.

A first surface 33 of the nozzle element 1, when the atomiser is in operation, is oriented towards a conduit that guides the liquid to the nozzles. It can include a central section, the central section being planar, with the plane being normal to the axis of (rotational) symmetry, or longitudinal axis, of the nozzle element 1. It can further include chamfered sections 11 including the nozzle inlets 31.

A second surface 34 of the nozzle element 1 faces the spray that is generated by the atomiser 10. The second surface 34 includes a spray shaping back end 12, which forms a recess in the second surface 34. The nozzle outlets 32 are arranged in walls of this recess. In a region surrounding the nozzle outlets 32, the walls can be flat and/or at a right angle to the longitudinal axis of the respective nozzle.

Figure 4:
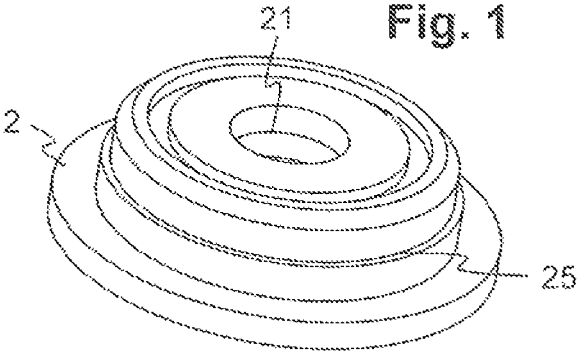
FIG. 4-5 a spray shaper.
Figure 5:
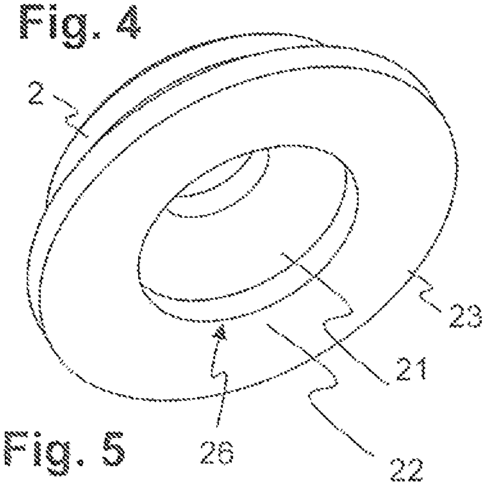

The spray shaper 2, also shown in FIGS. 4 and 5, by its inner wall 21, can define a volume that near the spray shaping back end 12 has a diameter of 8 mm and increases to a diameter of 16 mm near the front surface 23.

The spray shaper 2 typically is free from obstacles such as sieves or guiding vanes.

The spray shaper 2 can be manufactured from a plastic material, such as POM.

At an outer end of the spray shaper 2, it terminates in a circular flow guiding edge flow guiding edge 22. Seen in a longitudinal cross section, the flow guiding edge 22 in the present embodiment has a right angle between the inner wall 21 and the front surface 23. In other embodiments, this is an acute angle.

The nozzle element 1 is held in the body 4 by means of an interlocking region 13. The spray shaper 2 is held in the body 4 by means of a locking section 25. This can be a screw section or a bayonet joint, or a snap-fit connection, or a glued or a welded section, joining the spray shaper 2 and body 4. The spray shaper 2 holds the nozzle element 1 against the body 4. A gasket 24 can be arranged between the nozzle element 1 and the spray shaper 2. In other embodiments, the gasket 24 is optional.

Figure 6:
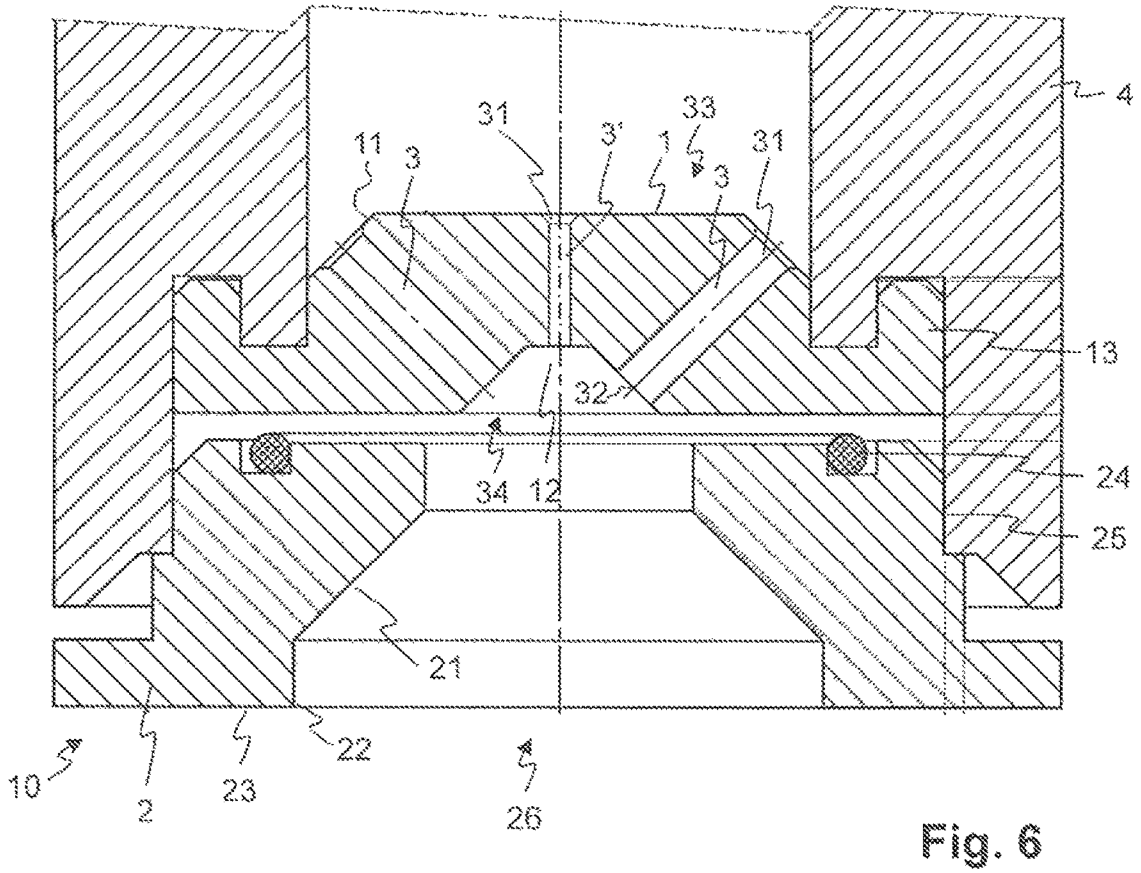
FIG. 6 a cross section through an atomiser having a third, central nozzle.

In FIGS. 1 and 6, the spray shaper 2 is shown in a position prior to final assembly. In the final position, the spray shaper 2 is pushed towards the nozzle element 1, and the gasket 24 is compressed between the nozzle element 1 and the spray shaper 2.

FIG. 6 shows a cross section through an atomiser having a third, central nozzle 3'. The longitudinal axis of the central nozzle 3', in this embodiment, is coincident with the longitudinal axis of the nozzle element 1. The central nozzle 3' causes the spray to be a full cone instead of a hollow cone (as it would be without the central nozzle 3'), and reduces noise generated by the atomiser. Although FIG. 6 shows a central nozzle in an embodiment in which the nozzle body and spray shaper are separate parts, a central nozzle can also be present in embodiments in which the nozzle body and spray shaper are integrally shaped.

In embodiments, a central nozzle is present, the spray shaper forms a hollow space that is free from obstacles such as sieves or guiding vanes, a distance between the collision point and the front surface of the spray shaper is between 14 and 30 millimetres, an inner wall of the spray shaper has a diameter between 10 and 25 millimetres, the longitudinal axes of the nozzles other than the central nozzle lie at an angle of 45°+/−15° degrees to the longitudinal axis of the atomiser, in particular at an angle of 45°+/−5° degrees, the diameter of the central nozzle is between 60% and 90%, in particular between 70% and 85%, in particular between 75% and 80% of the diameter of the nozzles other than the central nozzle, the number of nozzles other than the central nozzle is two or three of four, and an inner diameter of the nozzles other than the central nozzle is between 0.8 and 1.5 millimetres, and a throat of each of the nozzles, along which the nozzle has a constant diameter, has a length that is at least three times this inner diameter, and in particular at least 2.4 or at least three millimetres.

Figure 7:
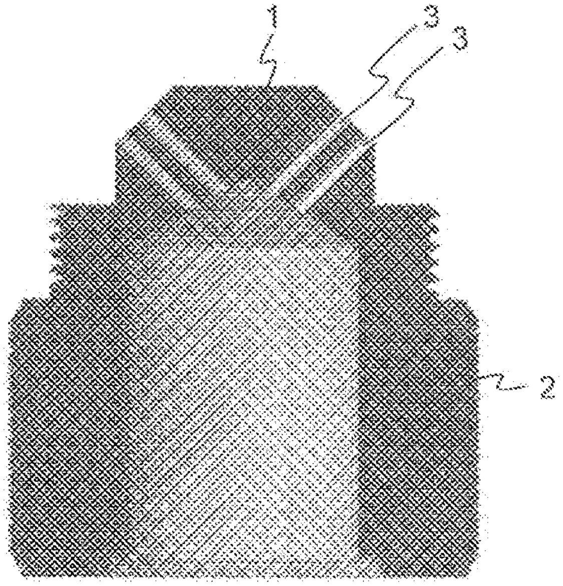
FIG. 7 an atomiser with two pairs of nozzles lying in the same plane and impinging at separate points on the longitudinal axis.

FIG. 7 shows an atomiser with two pairs of nozzles lying in the same plane and impinging at separate points on the longitudinal axis.

Figure 8:
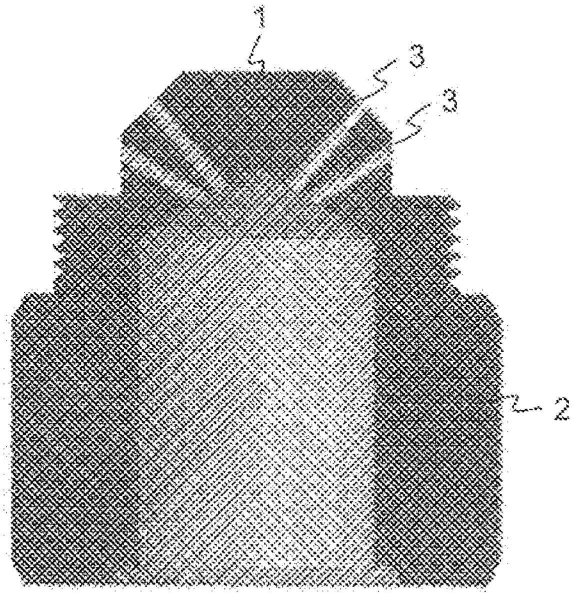
FIG. 8 an atomiser with two pairs of nozzles lying in the same plane and impinging at the same point.

FIG. 8 shows an atomiser with two pairs of nozzles lying in the same plane and impinging at the same point.

Figure 9:
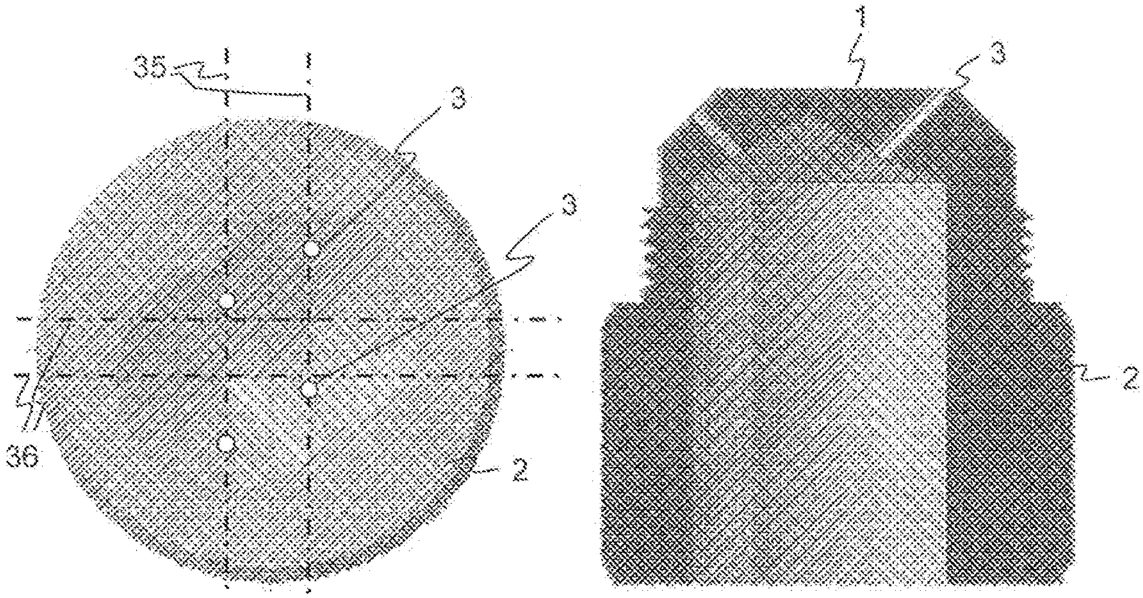
FIG. 9 an atomiser with two pairs of nozzles lying in different planes and initially generating separate, parallel sheets of water.

FIG. 9 shows an atomiser with two pairs of nozzles lying in different nozzle planes 35 and initially generating separate, parallel sheets of water lying in bisecting planes 36.

Figure 10:
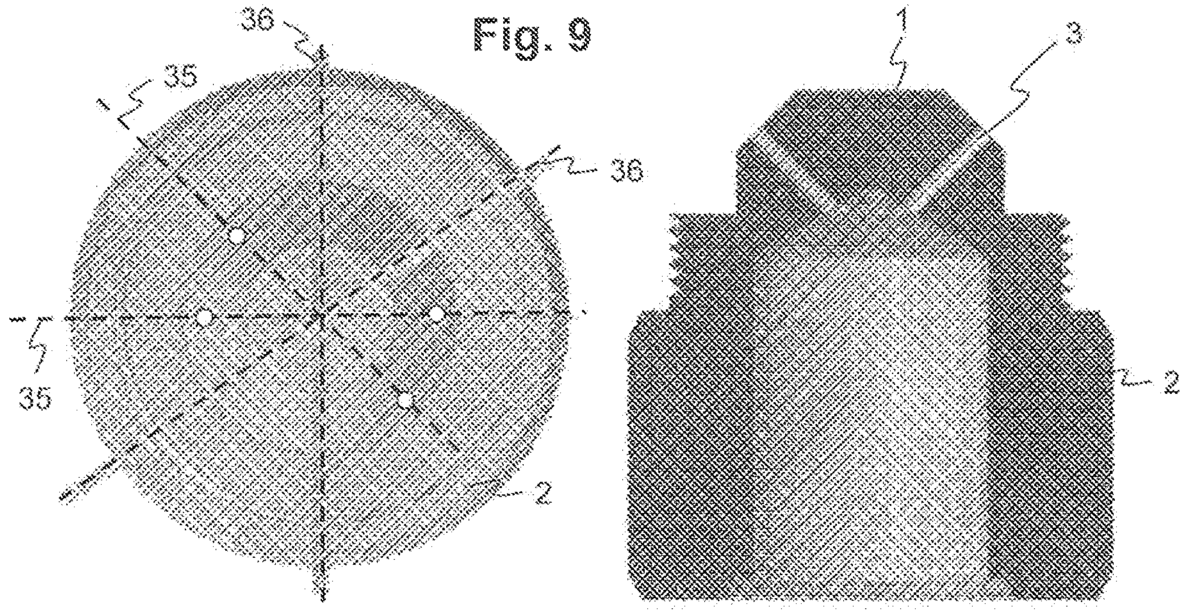
FIG. 10 an atomiser with two pairs of nozzles lying in different planes and impinging at the same point.

FIG. 10 shows an atomiser with two pairs of nozzles lying in different nozzle planes 35 and impinging at the same point.

The embodiments of FIGS. 7 through 10 are shown with the nozzles 3 and spray shaper being shaped in the same body. In other embodiments, nozzles 3 can be in a nozzle element 1 that is separate from the spray shaper 2, as in FIGS. 1 through 5.

Figure 11:
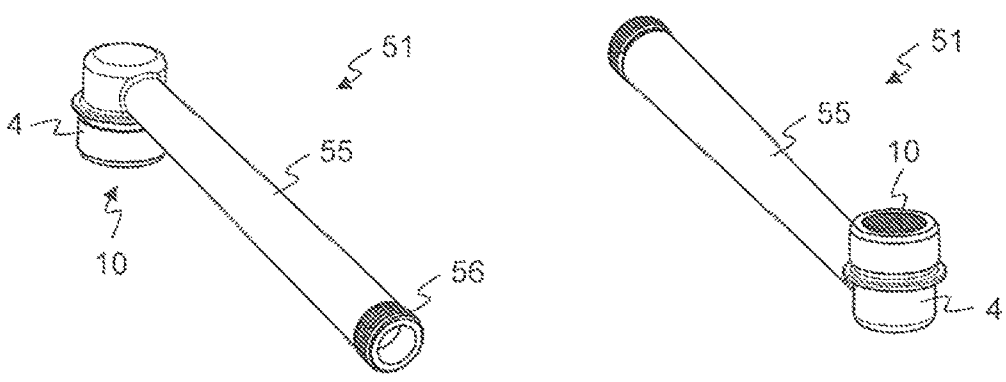
FIG. 11 a conduit and atomiser unit for a single atomiser.

FIG. 11 shows a conduit and atomiser unit 51 with a single atomiser 10. The atomiser 10 is supported by and supplied with liquid by a conduit element 55. The atomiser 10 can be removably or irremovably attached in a receptacle of the conduit element 55. It can be attached by means of a screw section, or a bayonet joint, or a snap-fit connection, or a glued or a welded section. A wall of the receptacle serves as the body 4 holding the atomiser 10, as shown in FIG. 1 or 6. The conduit element 55 includes a water hose attachment 56 for supplying liquid to the conduit element 55. The conduit element 55 can be manufactured as a single piece, e.g. by moulding a plastic material.

Figure 12:
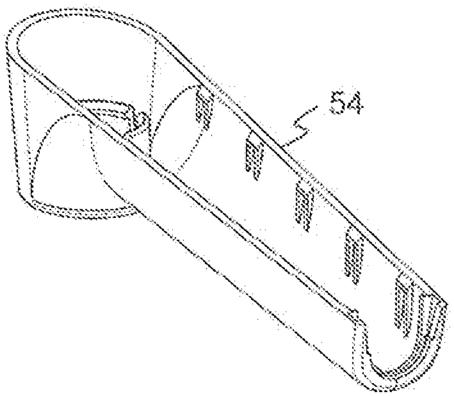
FIG. 12-13 corresponding parts of a shell unit.
Figure 13:
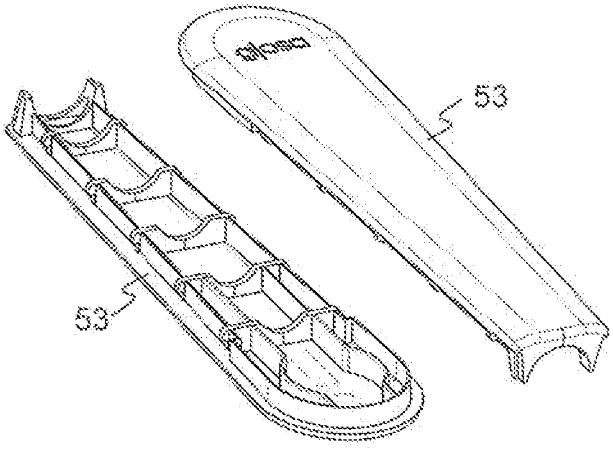

FIG. 12-13 shows corresponding parts of a shell unit 52, that is, a first shell part 53 and a second shell part 54. At least the first shell part 53 can be attached to and hold the conduit element 55, and serve as a handhold for manipulating the conduit element conduit and atomiser unit 51. The first shell part 53 and second shell part 54 can form a closed shell holding the conduit and atomiser unit 51.

Figure 14:
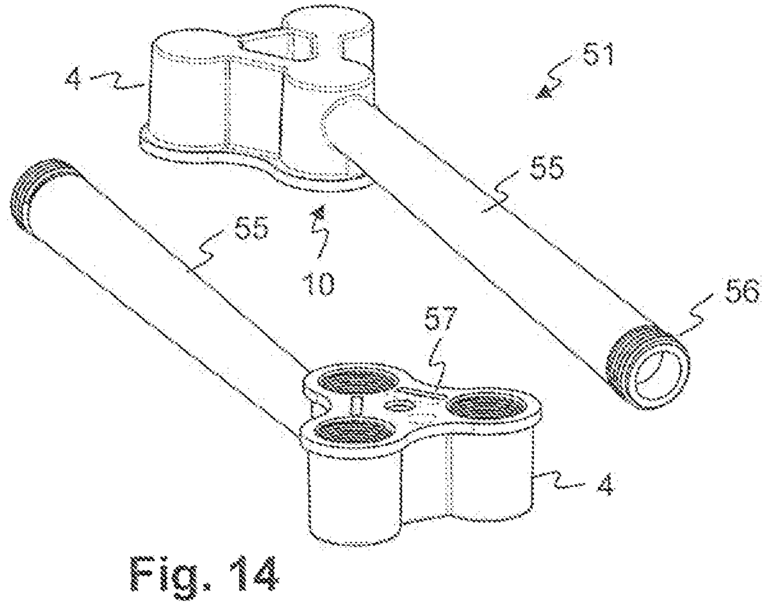
FIG. 14 a conduit and atomiser unit for three atomisers.
Figure 15:
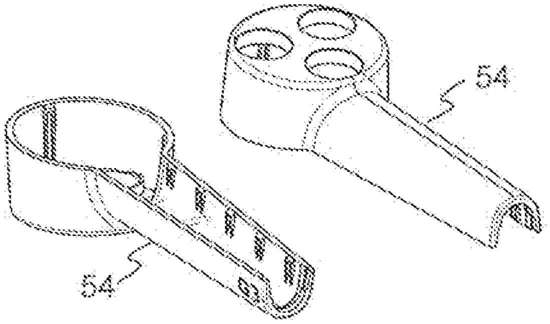
FIG. 15-16 corresponding parts of a shell unit.
Figure 16:
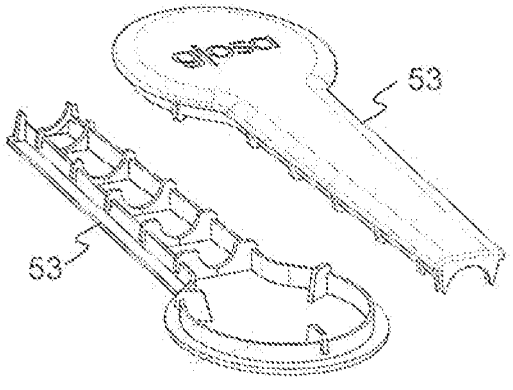

FIG. 14 shows a conduit and atomiser unit for three atomisers, with the atomisers removed. FIG. 15-16 shows corresponding parts of a shell unit. The structure and functions of the conduit and atomiser unit 51 and shell unit 52 and their parts are essentially the same as for the version with just one atomiser.

In addition, the conduit and atomiser unit 51 includes three receptacles, each for accommodating an atomiser 10. The conduit element 55 leads water into a chamber behind a first one of the atomisers 10, from where it is distributed to chambers behind the remaining two atomisers 10 by means of distributing channels. In order to generate the conduit and atomiser unit 51 with these distributing channels by injection moulding, a volume defining these channels can be moulded, using an insert shaped as the negative of the channel. After separating the unit from the mould, each channel can be closed off by an additional cover element 57. The conduit element 55 can thus be manufactured as a single piece, e.g. by moulding a plastic material, except for the cover elements. The distributing channels can have a small cross section since the atomisers 10 operate with a low flow rate. Thanks to this, it is possible to make them resistant to a high operating pressure without making the unit too large and/or too heavy. The entire construction of the conduit and atomiser unit 51 can be kept small. Thereby more freedom remains for designing the surrounding parts, such as the shell unit 52.

In all embodiments, typical parameters can be:

Dn—nozzle diameter: 0.8 to 1.5 or 2 millimetres, preferably approximately 1.3 millimetres.

L2—length of section of nozzles 12 with constant diameter: at least three times the value of Dn, in particular at least four times or at least five times the value of Dn. For example, at least 2.4 or 4 or 6 or 8 millimetres.

Phi_n—angle between longitudinal axes of the nozzles: 90°+/−20°

Phi_b—angle between surfaces at which the nozzles exit: between 90° and 130°, in particular at least approximately 120°.

Hs—distance between collision point and front surface 23 (approximately equal to the length of the spray shaper 2): Between 14 and 30 millimetres, in particular between 17 and 25 millimetres, in particular between 20 and 22 millimetres.

Hb—maximum distance between spray shaping back end 12 and front surface 23: Between 18 and 33 millimetres, in particular between 21 and 28 millimetres, in particular between 24 and 25 millimetres.

Difference between Hb and Hs: between 2 and 7, in particular between 3 and 5, in particular between 3 and 4 millimetres.

Fry—radius of the flow guiding edge 22 at the angle between the inner surface 21 of the spray shaper 2 and the adjacent section of the front surface 23: less than 2 millimetres, in particular less than 1 millimetre, in particular less than 0.8 millimetres, in particular less than 0.5 millimetres.

Re—radius of edge at nozzle outlet 32: less than 2 millimetres, in particular less than 1 millimetre, in particular less than 0.8 millimetres, in particular less than 0.5 millimetres.

Surface roughness inside the nozzles and/or at the inside of the spray shaper: smaller than 0.8 micrometres, corresponding to ISO Roughness Grade N6.

In some embodiments, water pressure ranges for operating the outlet are from 2 bar upwards. Domestic plumbing installations usually are limited to 3.5 or 4 bar. A possible pressure range thus is 1.5 to 3 bar. In other embodiments, a pump is provided for increasing the water pressure to more than 3 bar, more than 5 bar, more than 8 bar or more than 10 bar.

The diameter D2 in a nozzle 3—generally called the diameter or the hydraulic diameter of the nozzle—corresponds to the diameter of the water jet after exiting the nozzle 3 under ideal conditions, that is, with laminar flow and no diverging of the liquid after exiting the nozzle outlet 32, e.g. caused by adhesion.

While the invention has been described in present embodiments, it is distinctly understood that the invention is not limited thereto, but may be otherwise variously embodied and practised within the scope of the claims.

The invention claimed is:

1. A showerhead comprising one or more atomisers, each atomiser
   comprising a set of at least two nozzles arranged to create colliding jets of the liquid and thereby create a spray of droplets of the liquid, and a spray shaper for guiding the spray,
   the showerhead comprising a conduit and atomiser unit and a shell unit, wherein
   the conduit and atomiser unit comprises a conduit element and the one or more atomisers, the conduit element being arranged to guide water from a water hose attachment to the one or more atomisers and the one or more atomisers being rigidly attached to and supported by the conduit element;
   the shell unit comprising at least a first shell part arranged to cover at least part of the conduit and atomiser unit and to provide a handhold for holding the conduit and atomiser unit;
   wherein the conduit and atomiser unit constitutes a structurally independent, self-supporting and watertight unit.

2. The showerhead of claim 1, wherein the conduit and atomiser unit can perform the function of guiding water from the water hose attachment to the one or more atomisers without any part of the shell unit being present.

3. The showerhead of claim 1, comprising a second shell part, wherein the first and second shell part together form the shell unit, and the shell unit encloses and holds the conduit and atomiser unit.

4. The showerhead of claim 1, wherein the conduit element is manufactured as a single piece.

5. The showerhead of claim 1, comprising two or three atomisers.

6. The showerhead of claim 1, wherein the one or more atomiser units are removably attached to the conduit element.

7. The showerhead of claim 6, wherein the one or more atomiser units are removably attached to the conduit element by a snap-fit connection with the atomiser units being inserted into the conduit element from a front side.

8. The showerhead of claim 1, wherein the one or more atomiser units is irremovably attached to the conduit element.

9. An atomiser for use in a showerhead or tap for dispensing a liquid, comprising a nozzle element having a set of three or four or more nozzles arranged to create jets of the liquid that collide and thereby create a spray of droplets of the liquid, and a spray shaper for guiding the spray of droplets,
   wherein the jets of the three or four or more nozzles intersect in one point, and wherein a longitudinal axis of a central nozzle of the three or four or more nozzles is coincident with a longitudinal axis of the nozzle element.

10. The atomiser of claim 9, wherein the nozzle element with the nozzles and spray shaper are separate parts, or the nozzle element and spray shaper are integrally shaped parts.

11. The atomiser of claim 10, wherein the nozzle element comprises a first surface, the first surface comprising chamfered sections, and wherein nozzle inlets of associated nozzles lying in the chamfered sections.

12. The atomiser of claim 11, wherein surfaces of the chamfered sections lie at a right angle to a longitudinal axis of the associated nozzle.

13. The atomiser of claim 10, wherein the nozzle element comprises a second surface, the second surface comprising a recess, with nozzle outlets of the nozzles leading into the recess.

14. The atomiser of claim 13, wherein a surface of the recess, in regions comprising the nozzle outlets, lies at a right angle to the longitudinal axis of the associated nozzle.

15. The atomiser of claim 10, wherein the longitudinal axes of the nozzles lie at an angle of 45°+/−15° degrees to the longitudinal axis of the nozzle element.

16. The atomiser of claim 10, wherein the spray shaper comprises an inner wall defining an inner volume of the spray shaper, the inner volume opening up from a region near the nozzles towards a front surface of the spray shaper,
   the inner wall near the nozzles having a first, smaller diameter and near the front surface having a second, larger diameter.

17. The atomiser of claim 16, wherein the first diameter is between six and ten millimetres.

18. The atomiser of claim 17, wherein the second diameter is between ten and twenty-two millimetres.

19. The atomiser of claim 16, wherein a distance between a back surface of the spray shaper and the front surface of the spray shaper is between six and ten millimetres.

20. The atomiser of claim 10, wherein the nozzle element and spray shaper are assembled in a body, with the spray shaper connected to the body by a locking section and the spray shaper pressing and holding the nozzle element against the body.

21. The atomiser of claim 20, wherein the spray shaper is connected to the body by a non-separable connection.

22. The atomiser of claim 20, wherein the nozzle element and spray shaper are manufactured of a different material.

23. The atomiser of claim 10, comprising a nozzle element and a set comprising two or more interchangeable and different spray shapers.

24. The atomiser of claim 9, wherein the longitudinal axes of the nozzles other than the central nozzle lie at an angle of 45°30 /−15° degrees to the longitudinal axis of the nozzle element.

25. The atomiser of claim 9, wherein a diameter of the central nozzle is between 60% and 90% of a diameter of the nozzles other than the central nozzle.

26. The atomiser of claim 9, wherein two nozzles, other than the central nozzle, are provided.

27. The atomiser of claim 9, wherein three nozzles, other than the central nozzle, are provided.

28. The atomiser of claim 9, wherein four nozzles, other than the central nozzle, are provided.

29. The atomiser of claim 9, wherein an inner diameter of the nozzles other than the central nozzle is between 0.8 and 1.5 millimetres, and wherein, a throat of each of the nozzles, along which the nozzle has a constant diameter, has a length that is at least three times the inner diameter.

30. An atomiser for use in a showerhead or tap for dispensing a liquid, comprising four nozzles arranged to create colliding jets of the liquid and thereby create a spray of droplets of the liquid, and a spray shaper for guiding the spray, the atomiser wherein the four nozzles lie in a plane, the plane comprising the longitudinal axis of the atomiser, wherein the jets of the four nozzles pairwise intersect at different points along the longitudinal axis of the atomiser.

* * * * *